(12) United States Patent
Wang et al.

(10) Patent No.: US 9,335,468 B2
(45) Date of Patent: May 10, 2016

(54) FIBER BRAGG GRATING IN MICRO/NANOFIBER AND METHOD OF PRODUCING THE SAME

(75) Inventors: Dongning Wang, Hong Kong (HK); Xia Fang, China (CN); Changrui Liao, Hong Kong (HK)

(73) Assignee: The Hong Kong Polytechnic University, Hunghom, Kowloon (HK)

( * ) Notice: Subject to any disclaimer, the term of this patent is extended or adjusted under 35 U.S.C. 154(b) by 13 days.

(21) Appl. No.: 12/703,788

(22) Filed: Feb. 11, 2010

(65) Prior Publication Data

US 2011/0194805 A1  Aug. 11, 2011

(51) Int. Cl.
G02B 6/02 (2006.01)

(52) U.S. Cl.
CPC ........ G02B 6/02142 (2013.01); G02B 6/02152 (2013.01)

(58) Field of Classification Search
USPC ............................................. 385/12; 264/1.27
See application file for complete search history.

(56) References Cited

U.S. PATENT DOCUMENTS

| | | | | |
|---|---|---|---|---|
| 2,922,331 | A * | 1/1960 | Fastie et al. | 356/331 |
| 5,457,758 | A * | 10/1995 | Snitzer | 385/30 |
| 5,459,801 | A * | 10/1995 | Snitzer | 385/30 |
| 5,574,807 | A * | 11/1996 | Snitzer | 385/24 |
| 5,594,243 | A * | 1/1997 | Weinberger et al. | 250/288 |
| 5,867,305 | A * | 2/1999 | Waarts | H01S 3/06754 359/337.12 |
| 6,191,571 | B1 * | 2/2001 | Fukui et al. | 324/76.26 |
| 6,229,316 | B1 * | 5/2001 | Fukui et al. | 324/624 |
| 6,628,877 | B2 | 9/2003 | Dugan et al. | |
| 6,868,195 | B2 * | 3/2005 | Fujita | 385/12 |
| 6,993,221 | B2 | 1/2006 | Mihailov et al. | |
| 7,340,119 | B1 * | 3/2008 | Xu et al. | 385/12 |
| 7,473,906 | B2 * | 1/2009 | Egalon | 250/458.1 |
| 7,619,739 | B1 * | 11/2009 | Sutherland et al. | 356/432 |
| 8,036,503 | B2 * | 10/2011 | Sumetsky | G02B 6/02 385/100 |
| 8,270,787 | B2 * | 9/2012 | Sumetsky | G02B 6/305 385/28 |
| 8,385,696 | B2 * | 2/2013 | Hakuta | G02B 6/0229 359/341.1 |
| 8,488,925 | B2 * | 7/2013 | Sumetsky | G02B 6/305 385/31 |
| 8,727,613 | B2 * | 5/2014 | Mihailov | 374/131 |
| 8,755,653 | B2 * | 6/2014 | DiGiovanni | G02B 6/4201 385/129 |
| 9,127,933 | B2 * | 9/2015 | Sumetsky | G01M 11/37 |
| 2003/0231818 | A1 * | 12/2003 | Cantin et al. | 385/12 |
| 2005/0002606 | A1 * | 1/2005 | James et al. | 385/31 |
| 2005/0035278 | A1 * | 2/2005 | Margalit et al. | 250/227.14 |
| 2005/0111793 | A1 * | 5/2005 | Grattan et al. | 385/37 |
| 2005/0115936 | A1 * | 6/2005 | Gu | B23K 26/04 219/121.69 |

(Continued)

OTHER PUBLICATIONS

P. S. Westbrook et al., Cladding-Mode Resonances in Hybrid Polymer—Silica Microstructured Optical Fiber Gratings, IEEE Photonics Technology Letters, vol. 12, No. 5, May 2000 (Westbrook).*

(Continued)

*Primary Examiner* — Andrew Jordan
(74) *Attorney, Agent, or Firm* — Ella Cheong Hong Kong; Sam T. Yip (57) ABSTRACT

A method of fabricating Fiber Bragg gratings in a micro/nanofiber using ultrashort pulse irradiation, the method includes elongating and flame-brushing a single mode optical fiber to create a micro/nanofiber, and generating the ultrashort pulse irradiation to induce a plurality of refractive index changes at predetermined intervals within the micro/nanofiber, wherein the ultrashort pulse propagates through a focusing element and a diffractive element prior to propagating on the micro/nanofiber.

5 Claims, 9 Drawing Sheets

(56) References Cited

U.S. PATENT DOCUMENTS

| | | | |
|---|---|---|---|
| 2005/0253051 A1* | 11/2005 | Hwang et al. | 250/227.18 |
| 2005/0269490 A1* | 12/2005 | Loock et al. | 250/227.14 |
| 2006/0029322 A1* | 2/2006 | Mihailov et al. | 385/12 |
| 2007/0184557 A1* | 8/2007 | Crudden et al. | 436/171 |
| 2008/0129980 A1* | 6/2008 | Dhawan et al. | 356/12 |
| 2009/0059233 A1* | 3/2009 | Sumetsky | G01N 21/7703 356/436 |
| 2009/0074347 A1 | 3/2009 | Xia et al. | |
| 2010/0209044 A1* | 8/2010 | Sumetsky | G02B 6/305 385/28 |
| 2010/0209061 A1* | 8/2010 | Sumetsky | G02B 6/02 385/123 |
| 2011/0194805 A1* | 8/2011 | Wang et al. | 385/12 |
| 2011/0292965 A1* | 12/2011 | Mihailov | 374/121 |
| 2012/0121221 A1* | 5/2012 | Hakuta | G02B 6/0229 385/37 |
| 2012/0213474 A1* | 8/2012 | DiGiovanni | G02B 6/4201 385/30 |
| 2012/0223221 A1* | 9/2012 | Jones | B82Y 15/00 250/269.1 |
| 2012/0301077 A1* | 11/2012 | Sumetsky | G02B 6/305 385/32 |
| 2014/0079360 A1* | 3/2014 | Winarski | G02B 6/262 385/102 |
| 2014/0110351 A1* | 4/2014 | Fahs, II | C02F 1/32 210/748.11 |
| 2014/0211198 A1* | 7/2014 | Sumetsky | G01M 11/37 356/72 |
| 2015/0115146 A1* | 4/2015 | Jones | B82Y 15/00 250/269.1 |
| 2015/0252322 A1* | 9/2015 | Nain | A61L 27/3804 435/396 |
| 2015/0277049 A1* | 10/2015 | Sumetsky | G02F 1/0126 385/30 |

OTHER PUBLICATIONS

Fiber Optic Sensors, Second Edition, Edited by Shizhuo Yin, Paul B. Ruffin, and Francis T. S. Yu, Chapter 5, pp. 181-182 (CRC Press 2008, Print ISBN: 978-1-4200-5365-4, eBook ISBN: 978-1-4200-5366-1).*

Corning, Inc., Corning(r) SMF-28(tm) Optical Fiber Product Information, Apr. 2002.*

Limin Tong et al., Subwavelength-diameter silica wires for low-loss optical wave guiding, Nature vol. 426 18/25 Dec. 2003.

Gilberto Brambilla et al., Ultra-low-loss optical fiber nanotapers, Optics Express vol. 12 No. 10, May 17, 2004.

M. Sumetsky et al., Fabrication and study of bent and coiled free silica nanowires: Self-coupling microloop optical interferometer, Optics Express vol. 12 No. 15, Jul. 26, 2004.

S. G. Leon-Saval, Supercontinuum generation in submicron fibre waveguides, Optics Express vol. 12 No. 13, Jun. 28, 2004.

Pavel Polynkin et al. Evanescent field-based optical fiber sensing device for measuring the refractive index of liquids in microfluidic channels, Optics Letters vol. 30, No. 11, Jun. 1, 2005.

Fei Xu et al., Optical microfiber coil resonator refractometric sensor, Optics Express vol. 15 No. 12, Jun. 11, 2007.

M. Sumetsky et al., Optical liquid ring resonator sensor, Optics Express vol. 15 No. 22, Oct. 29, 2007.

M. Sumetsky, Basic Elements for Microfiber Photonics: Micro/Nanofibers and Microfiber Coil Resonators, Journal of Lightwave Technology vol. 26 No. 1, Jan. 1, 2008.

Xiaoshun Jiang, All-fiber add-drop filters based on microfiber knot resonators, Optics Letters vol. 32, No. 12, Jun. 15, 2007.

Yuhang Li and Limin Tong, Mach-Zehnder interferometers assembled with optical microfibers or nanofibers, Optics Express vol. 33 No. 4, Oct. 29, 2007.

A. Iadicicco et al., Thinned Fiber Bragg Gratings as High Sensitivity Refractive Index Sensor, IEEE Photonics Technology Letters, vol. 16, No. 4, Apr. 2004.

Wei Liang et al., Highly sensitive fiber Bragg grating refractive index sensors, Applied Physics Letters 86, 151122 (2005).

Athanasios N. Chryssis et aol, High Sensitivity Evanescent Field Fiber Bragg Grating Sensor, IEEE Photonics Technology Letters, vol. 17, No. 6, Jun. 2005.

Kim.A. Winick et al., Fabrication and characterization of photonic devices directly written in glass using femtosecond lasers.

Stephen J. Mihailov et al., Bragg Gratings Written in All-SiO2 and Ge-Doped Core Fibers With 800-nm Femtosecond Radiation and a Phase Mask, Journal of Lightwave Technology vol. 22, No. 1, Jan. 2004.

Yannick K. Lize et al., Microstructured optical fiber photonic wires with subwavelength core diameter, Optics Express vol. 12, No. 14, Jul. 12, 2004.

F. Bilodeau et al., Low-Loss Highly Overcoupled Fused Couplers: Fabrication and Sensitivity to External Pressure, Journal of Lightwave Technology, vol. 6, No. 10, Oct. 1988.

* cited by examiner

FIBER BRAGG GRATING IN MICRO/NANOFIBER AND METHOD OF PRODUCING THE SAME

BACKGROUND OF THE INVENTION

1. Field of the Invention

The present invention relates to a method for inducing refractive index changes in a micro/nanofiber, more particularly, to a method for fabricating Fiber Bragg gratings in a micro/nanofiber.

2. Description of the Related Art

There has been increasing interest in optical micro/nanofibers (MNFs) in recent years because of their unique properties. An optical MNF is an optical fiber in micro or nano scale that essentially consists of only fiber core, surrounded by air or other ambient medium. When light travels along the cladding-less MNF, it is tightly confined to the fiber core due to the large refractive index contrast between the fiber core and surrounding medium. A large fraction of the guided light can propagate outside the MNF as the evanescent wave, which makes it highly sensitive to the surrounding medium. The small size of the MNF also provides excellent flexibility and convenient configurability, allowing the easy manipulation of the MNF based devices with a complex topology. Many MNF based fiber devices have been developed, with important applications in the area such as refractive index (RI) sensing.

Fiber Bragg Grating (FBG) is one of the basic optical fiber components that have a wide range of applications. FBG introduces periodic variations in the refractive index (RI) in the fiber core that reflects particular wavelengths and transmits other wavelengths. However, a conventional FBG is intrinsically insensitive to external RI change as it is not directly exposed to the surrounding medium. Although such a difficulty may be alleviated by thinning or etching of the fiber after the FBG creation, the mechanical strength and durability of these sensing devices are greatly reduced, which limit the applications of these FBG based RI sensors.

Fiber Bragg gratings can be created by inscribing the periodic variation of refractive index into the fiber core using an intense ultraviolet (UV) light. However, this type of UV inscription method is limited to photosensitive optical fibers with hydrogen loading. Generally, germanium-doped silica fibers are used to fabricate FBG under this method.

The present FBG in MNF can overcome the above-mentioned difficulties and enhance the RI sensitivity because of its narrow bandwidth, small grating size and good measurement accuracy. Moreover, FBG can support the multiplexed system, showing significant advantages over other types of fiber gratings.

Another tool for FBG fabrication is an ultra-short laser such as femtosecond laser, which allows inscription of FBG in almost any type of optical fibers without photosensitivity, as disclosed in Mihailov et al., "Bragg Gratings Written in All-SiO2 and Ge-Doped Core Fibers With 800-nm. Femtosecond Radiation and a Phase Mask," *J. Lightwave Technol.* 22, 94 (2004). Because of the extremely high light intensity across a small spatial region and an ultra-short interaction time, the refractive index change induced by the high power femtosecond pulses is highly localized, which supports the fabrication of strong and high spectral quality FBGs.

SUMMARY OF THE INVENTION

According to an aspect of the present invention, the present invention provides a method of fabricating Fiber Bragg gratings in a micro/nanofiber using ultrashort pulse irradiation, the method includes elongating and flame-brushing a single mode optical fiber to create a micro/nanofiber, and generating the ultrashort pulse irradiation to induce a plurality of refractive index changes at predetermined intervals within the micro/nanofiber, wherein the ultrashort pulse propagates through a focusing element and a diffractive element prior to propagating on the micro/nanofiber.

According to another aspect of the present invention, the present invention provides a refractive index sensing device that includes an optical micro/nanofiber having periodic index changes at predetermined intervals within the optical micro/nanofiber, the optical micro/nanofiber is a cladding-less fiber, wherein the optical micro/nanofiber is capable of measuring refractive index of an ambient medium.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention are described below in detail with reference to the accompanied drawings.

Fiber Bragg grating can be fabricated in a micro/nanofiber by use of femtosecond pulse irradiation. The FBG can be directly exposed to the surrounding medium without etching or thinning treatment of the fiber, thus possessing high refractive index sensitivity while maintaining superior reliability. The grating in the micro/nanofiber may have a number of propagation modes in its transmission spectrum, depending on the fiber diameter, and the higher order of mode has larger refractive index sensitivity. Such a grating can be used in various types of optical fiber sensing applications.

According to one embodiment, the present invention provides a FBG fabrication method by use of femtosecond pulse irradiation in MNF with diameters ranging from 2 to 10 μm. Such an FBG can be directly exposed to the surrounding medium without etching or thinning treatment of the fiber, thereby providing an easy and convenient way of achieving high sensitivity measurement while retaining wavelength encoded measurand information.

Figure 2:
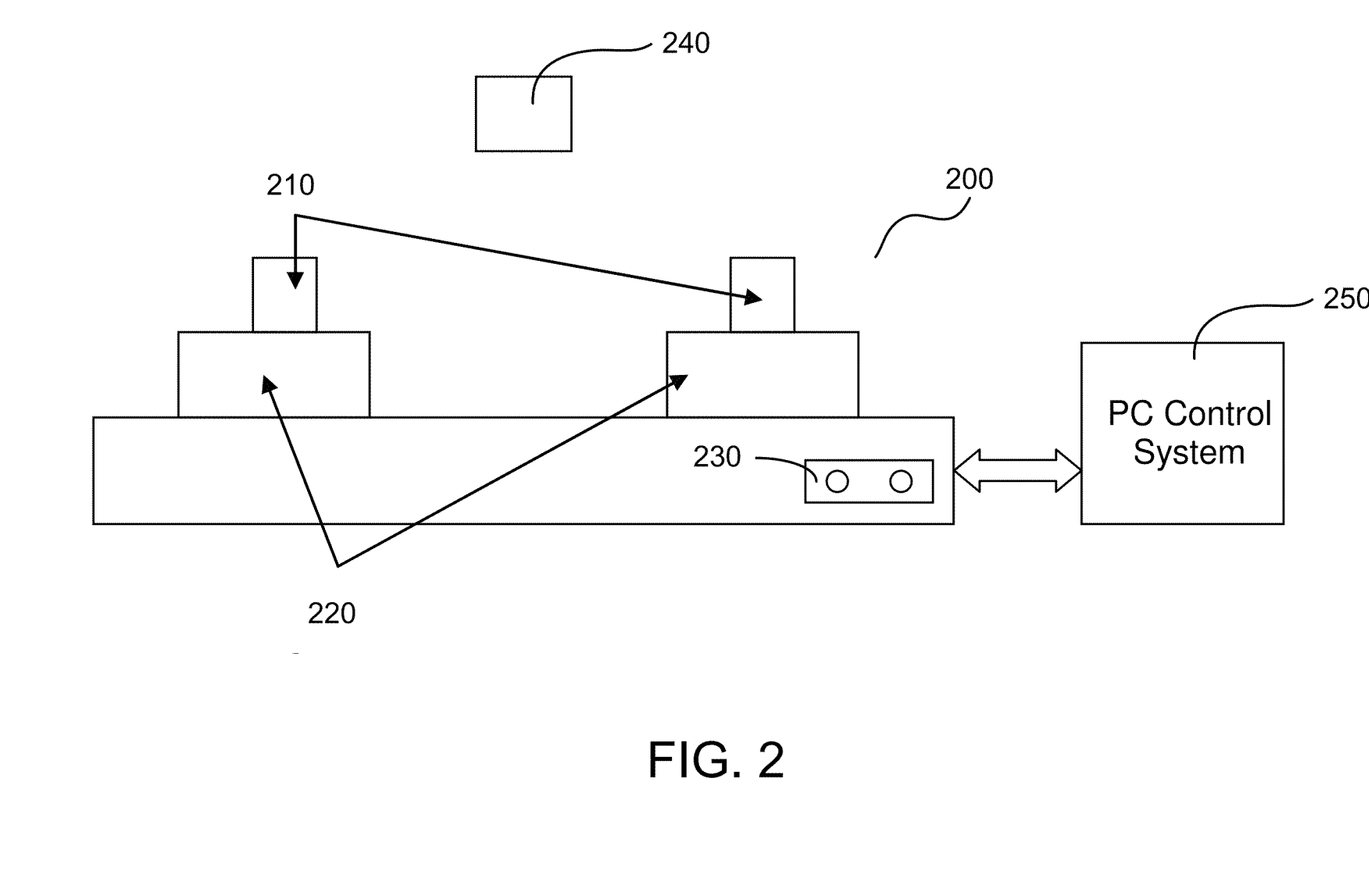
FIG. 2 illustrates an exemplary optical coupler manufacturing system.

According to one embodiment, the MNF is produced by the use of flame brushing method in a simple optical coupler manufacturing system (e.g., OC 2010 produced by Nanjing Jilong Optical Communication Co., Ltd.) where a small flame moves slowly on a single mode fiber (SMF). The SMF can be made of a photosensitive material or a non-photosensitive material. An exemplary optical coupler manufacturing system 200 is illustrated in FIG. 2, which contains a pair of fiber holders 210 installed on a double direction pulling instrument 220, a movable torch 240, a position detector 230, and a PC control system 250.

A single mode optical fiber is placed and secured between the pair of fiber holders 210. The fiber holders 210 are attached with a pair of double direction pulling instruments 220 that is capable of stretching and elongating the optical fiber. Movable torch 240 is capable of moving along the fiber length by using a stepper motor or the like, and the intensity of the torch flame can be adjusted by controlling the flux of $H_2$, which can be approximately 134 sccm (standard cubic centimeters per minute), just enough to support the flame to soften the fiber without inducing a large loss.

The position detector 230 is capable of transmitting position information of the double direction pulling instrument 220 to PC control system 250. PC control system 250 is capable of communicating with the optical coupler manufacturing system 200 to control the movement, speed, and power of the movable torch 240 relative to the fiber holders 210.

The relative speed of the torch and holders plays an important role in the formation of the MNF and its insertion loss. If the speed is high, the fiber diameter becomes large, owing to the limited softening time of the fiber. When the speed is low, a high insertion loss will result, due to the large fiber deformation. Thus, by appropriately controlling the speed of the flame and the holders, MNFs of different diameters exhibiting a loss of less than 0.1 dB can be achieved. While the fabrication of the MNF has been described using flame brushing, other methods for fabricating MNFs may also be utilized.

According to one embodiment, the femtosecond pulse is generated from a Ti:sapphire laser system consisting of an oscillator such as a Mai Tai® SP Short Pulse Ultrafast Oscillator and an amplifier (e.g., Spitfire® Pro Ultrafast Amplifier). Then, the pulse propagates into a pair of gratings to disperse the spectrum and stretches the pulse by a factor of a thousand. The stretched long pulse is then amplified by a power amplifier. A second pair of gratings reverses the dispersion of the first pair, and recompresses the pulse to femtosecond scale, resulting in a high-energy ultrashort pulse.

Figure 3:
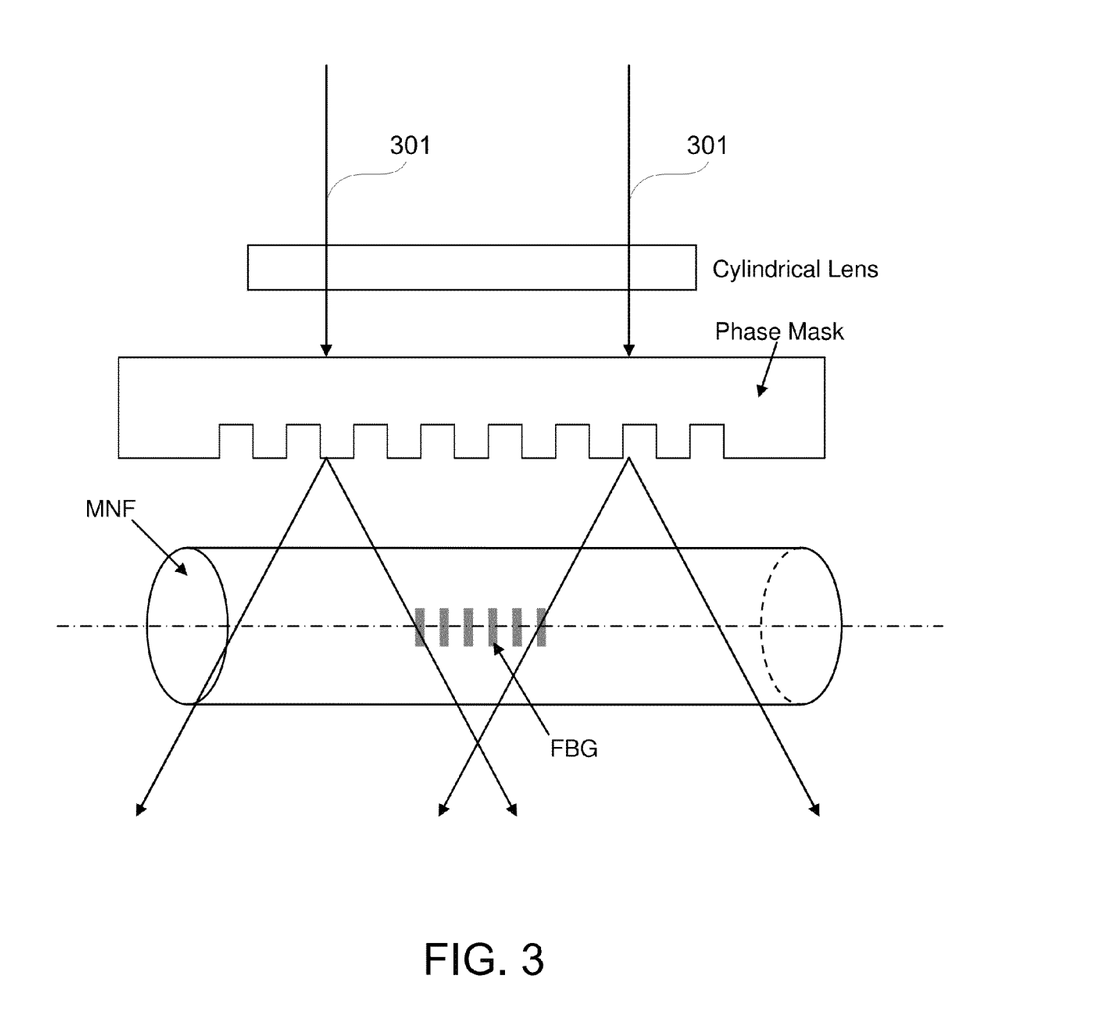
FIG. 3 illustrates periodic index changes being inscribed on a MNF in accordance with an exemplary embodiment.

The output pulses duration is 120 fs with a repetition rate of 1 kHz at 800 nm. The maximum output energy is 1 mJ. The laser exposure time can be less than 10 s and the pulse energy can be adjusted from 100 to 200 µJ during MNF inscription by rotating a half wave-plate followed by a linear polarizer. During the FBG fabrication, the MNF is placed in front of a diffractive element such as a phase mask, with a chirp rate of 4.8 nm/cm and a period of 2149.95 nm. As shown in FIG. 3, when the laser beams 301 are activated from the Short Pulse Ultrafast Oscillator and the amplifier system, ultra-short pulse irradiation is emitted through a cylindrical lens. The cylindrical lens is a focusing element that focuses the ultrashort pulse provided by the laser source. After that, the ultrashort pulse passes through a diffractive element (i.e., phase mask) to create an interferometric pattern. Then, the diffracted ultra-short pulses of light propagate into the optical MNF. As a result, the intensity peaks of the interference fringe pattern are inscribed along the fiber length. Thus, the periodic index changes within the MNF at predetermined intervals, or the Fiber Bragg Gratings, can be inscribed.

Figure 4:
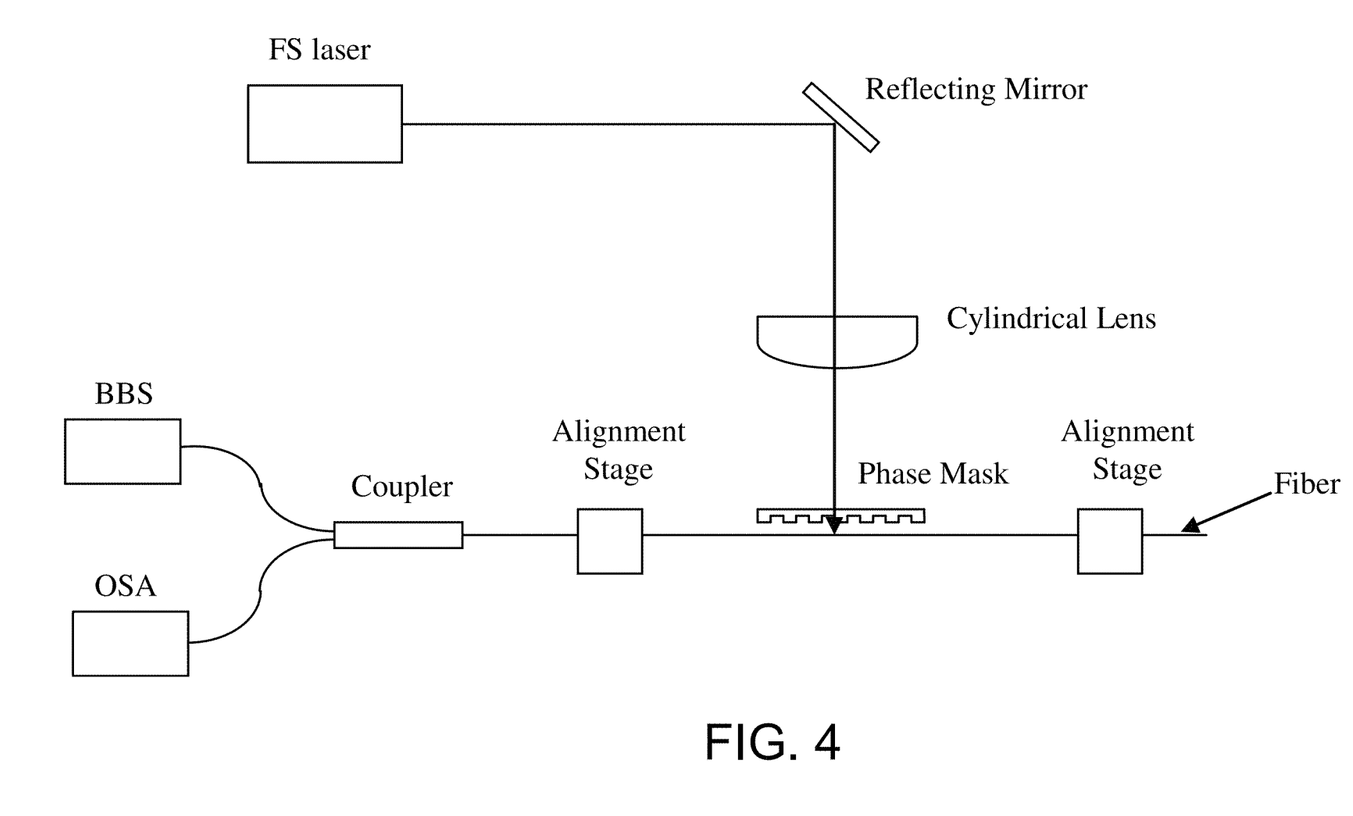
FIG. 4 illustrates an exemplary configuration of a measurement system.

The reflection spectra of the FBG being created can be measured in line by using light from a broadband light source (BBS) and an optical spectrum analyzer (OSA). The exemplary configuration for measurement system is shown in FIG. 4.

Figure 1A:
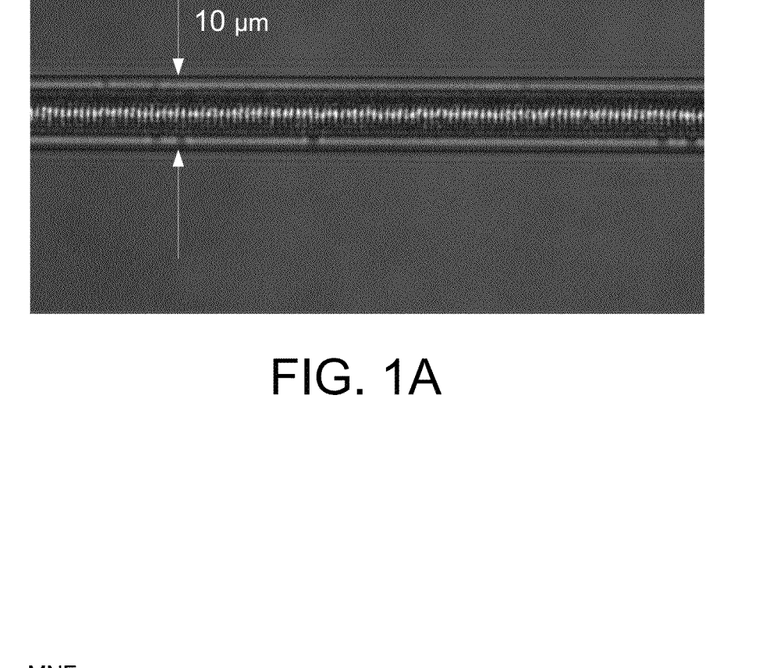
FIG. 1A is a microscopic image of a MNF with a diameter of approximately 10 μm.
Figure 1B:
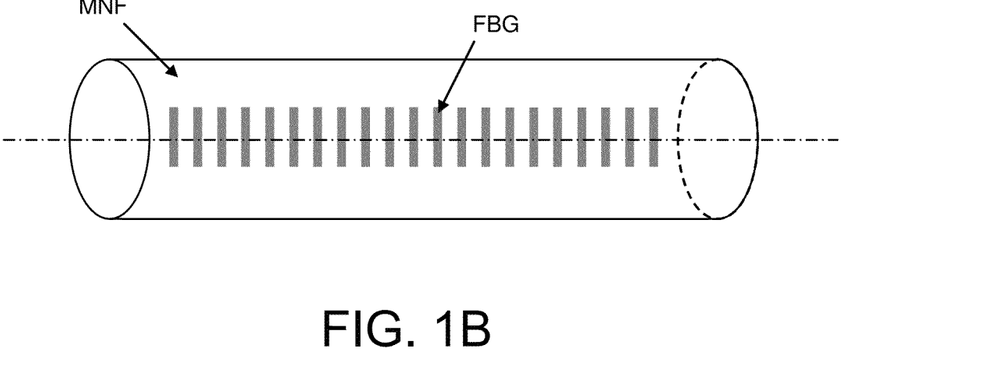
FIG. 1B illustrates a MNF with Fiber Bragg gratings in accordance with an embodiment of the present invention.

The microscopic image of the FBG fabricated in a MNF with a diameter of 10 µm is shown in FIG. 1A. A clearer illustration of the fabricated MNF with FBG is shown in FIG. 1B.

Figure 5:
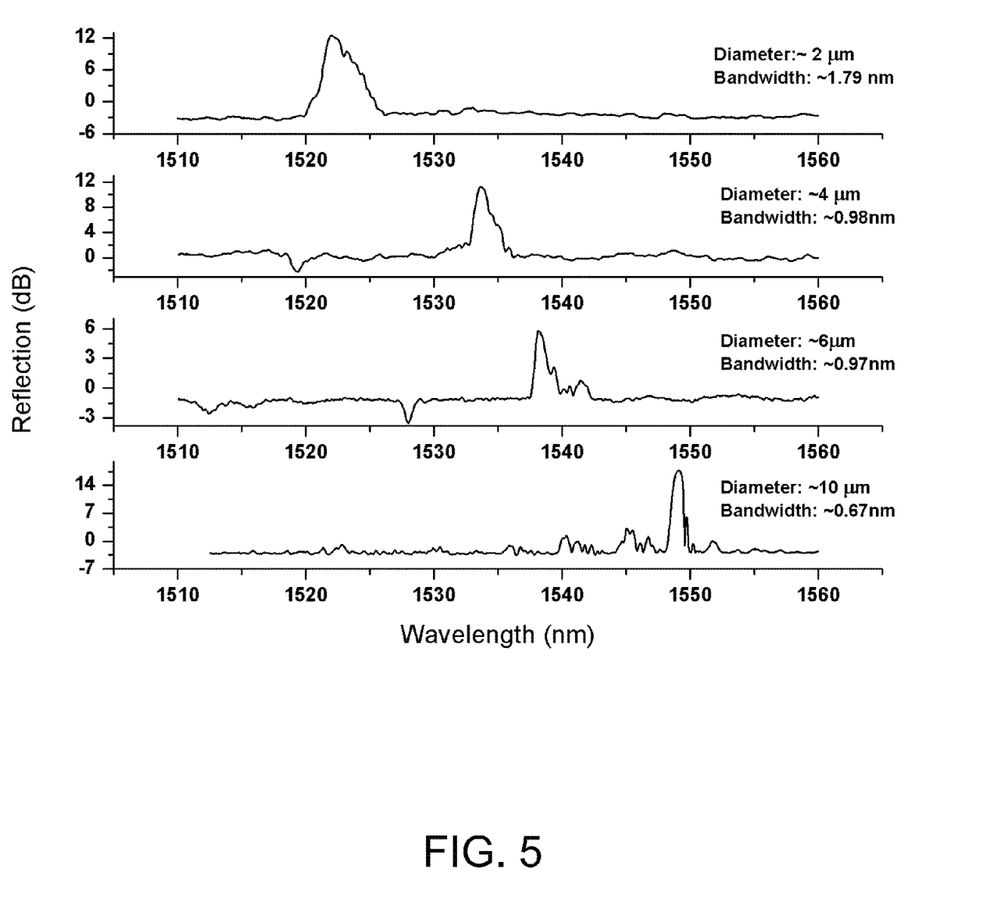
FIG. 5 illustrates reflection spectra of FBGs in MNFs with diameters of 2, 4, 6, and 10 μm, respectively.

FIG. 5 illustrates the reflection spectra of the FBGs in the microfibers with various diameters from 10 µm to 2 µm. The optical spectrum analyzer (OSA) used has the resolution of 0.01 nm. It can be seen from FIG. 5 that the center wavelength of the FBG is "blue shifted" with the decrease of the fiber diameter, as more propagating mode energy goes outside the fiber, causing the reduction of the fiber's effective RI. The 3-dB bandwidth of the FBG varies from 0.67 to 1.79 nm, owing to the variation of fabrication conditions such as the changes in fiber position, laser exposure time and the chirped phase mask used.

Figure 6:
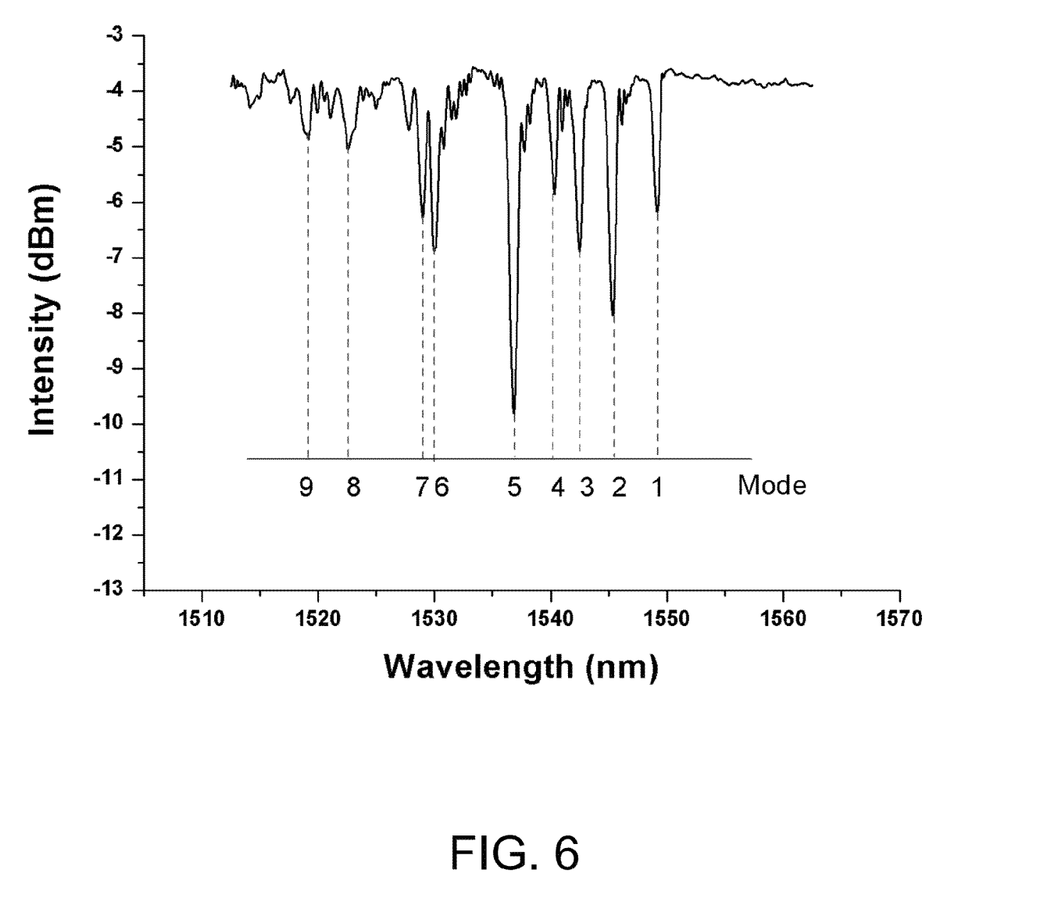
FIG. 6 illustrates a transmission spectrum of FBGs in MNF with a diameter of about 10 μm.

FIG. 6 illustrates transmission spectrums of a FBG with a MNF diameter of 10 µm. In comparison with its reflection spectrum shown in FIG. 5, where only one fundamental reflection mode appears, 9 modes exist in the same wavelength range between 1512 and 1562 nm.

Figure 7:
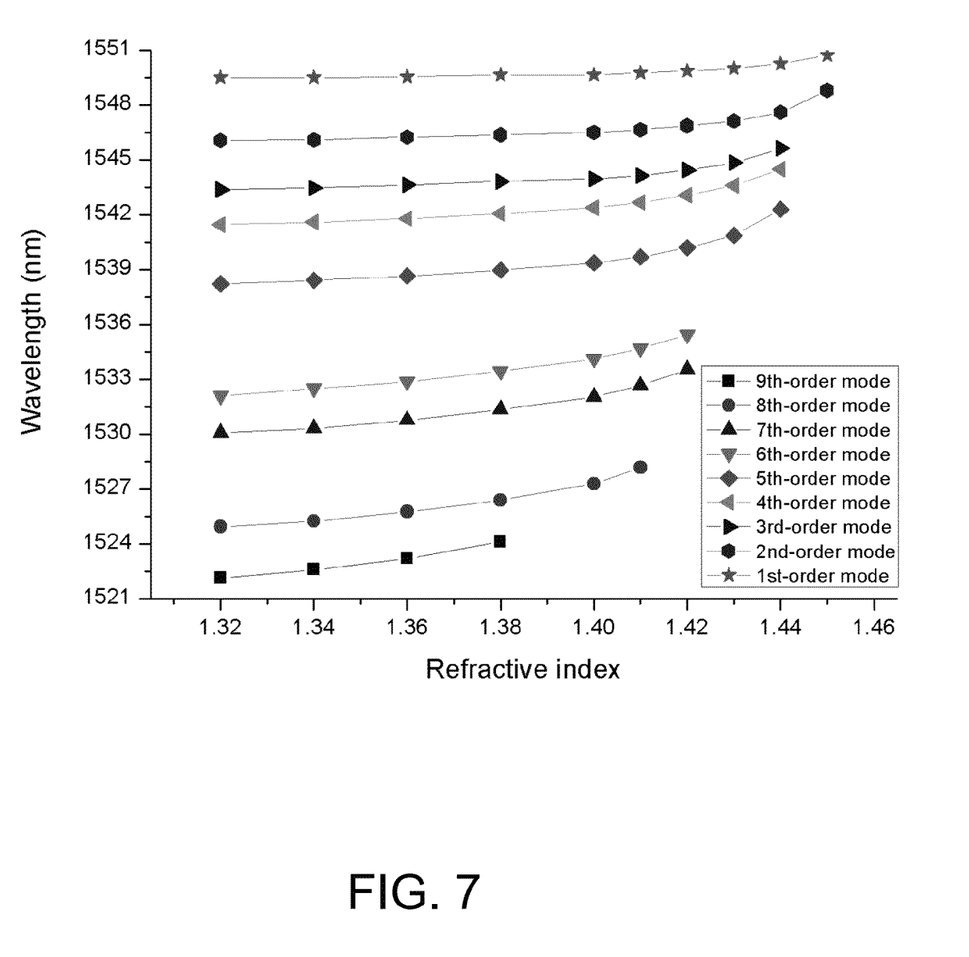
FIG. 7 illustrates wavelength changes with the external RI at different orders of resonance mode.

The present invention can be used to effectively measure external RI. The external RI measurement by use of the FBG in MNF can be carried out at room temperature by immersing the FBG into RI liquids with RI values (e.g., Cargille Refractive Index Liquids) varying from 1.32 to 1.46. Each time after the measurement, the device is rinsed with methanol carefully until the original spectrum is restored with no residue liquid. FIG. 7 shows the red shift of the transmission wavelengths when the ambient RI increases. When the RI is close to the fiber index value, a relatively high sensitivity can be obtained, owing to the enhanced influence of the external RI on the propagation mode, which becomes less confined in the fiber.

Figure 8:
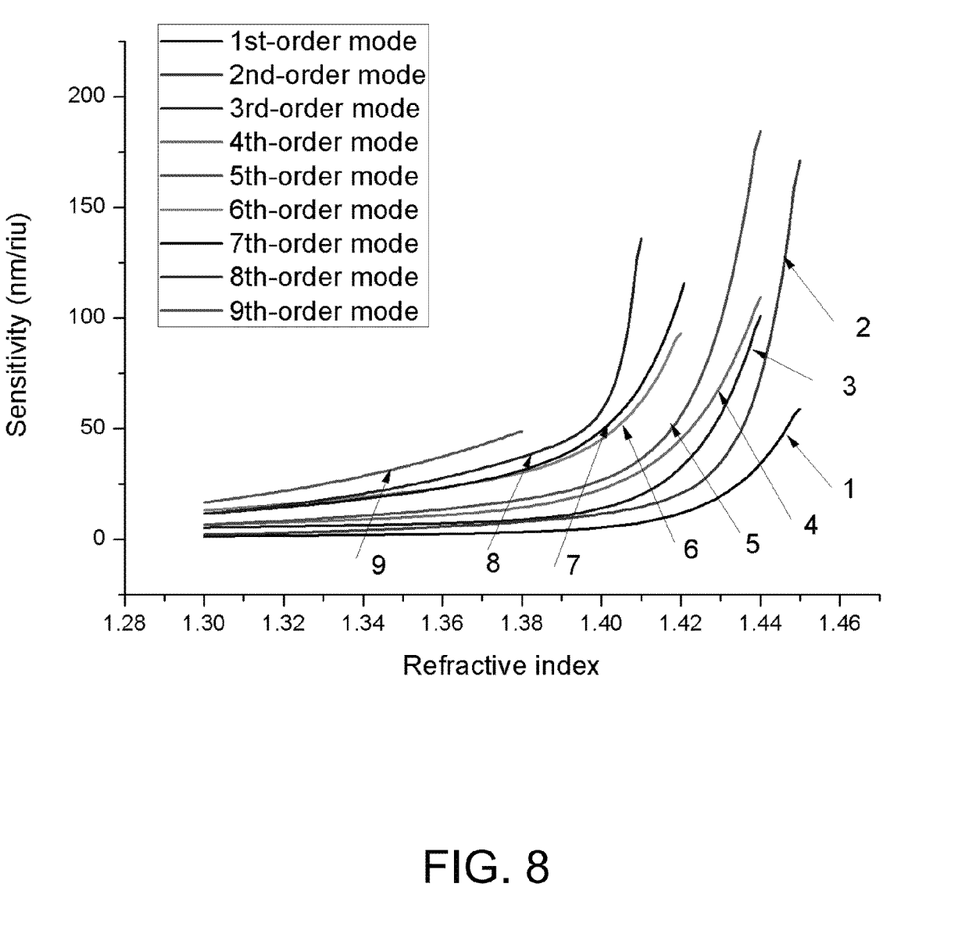
FIG. 8 illustrates RI sensitivity of different orders of mode for FBGs in MNFs with a diameter of about 10 μm.

The higher order mode which has more energy distributed outside the fiber exhibits the higher sensitivity to the ambient RI. FIG. 8 shows the RI sensitivity for different orders of fiber mode when the fiber diameter is about 10 µm. The sensitivity is obtained by calculating the first order derivative of the wavelength shift curve shown in FIG. 7, followed by an exponential curve fitting. According to FIG. 8, with the same ambient RI, the higher order resonance mode has higher sensitivity compared with the lower order mode. The maximum sensitivity obtained can be as high as 184.6 nm/RIU (refractive index unit), for the fifth order mode, at the RI value of 1.44.

Figure 9A:
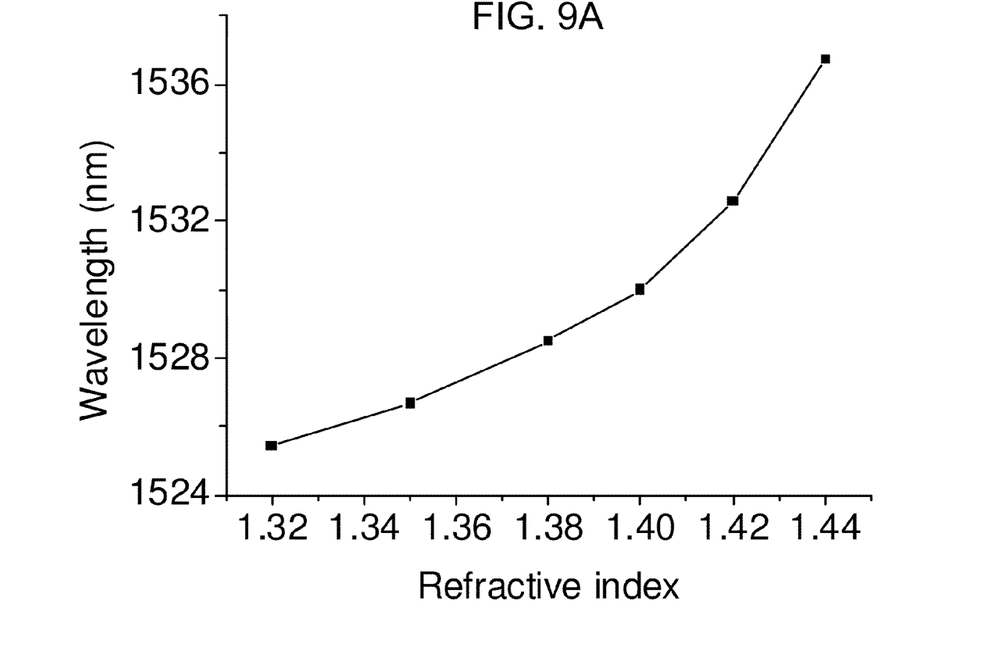
FIG. 9A illustrates wavelength change with external RI at the fundamental mode for FBGs in MNFs with a diameter of approximately 2 μm.
Figure 9B:
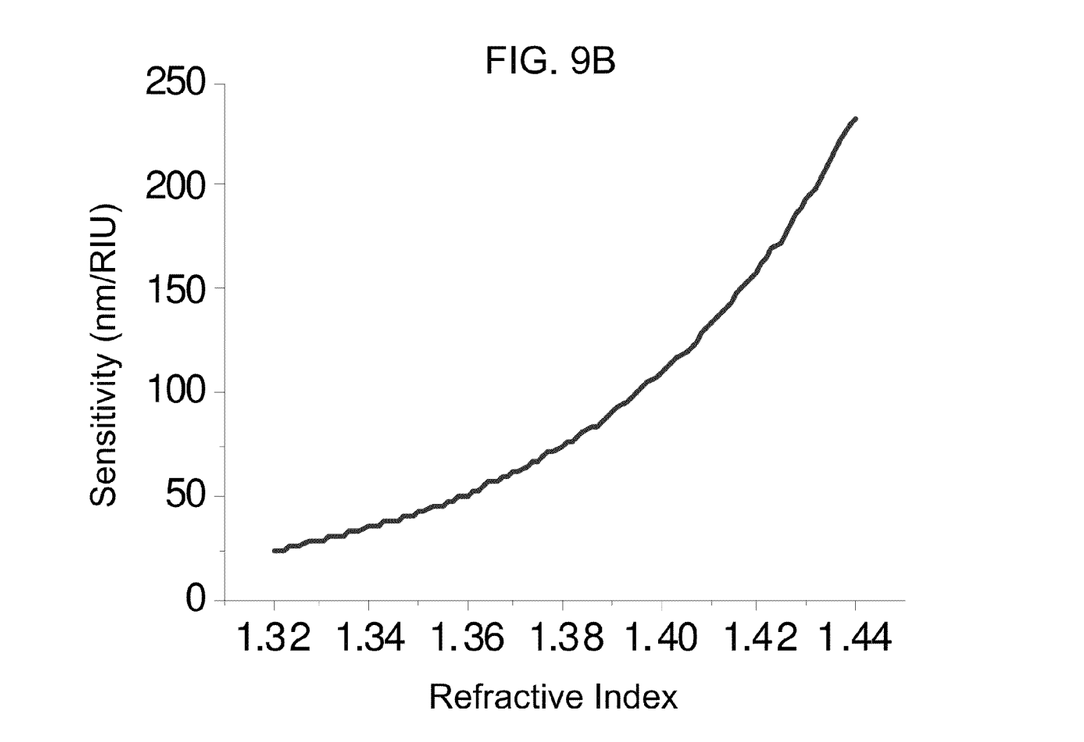
FIG. 9B illustrates RI sensitivity of the fundamental mode for FBG in a MNF with a diameter of approximately 2 μm.

The RI sensitivity also depends on the fiber diameter and is increased when a smaller fiber diameter is used. FIG. 9A illustrates that as external RI increases, wavelength also increases. As shown in FIG. 9B, the maximum sensitivity is 231.4 nm/RIU for the fundamental mode, at the RI value of 1.44, corresponding to the fiber diameter of 2 µm.

A FBG in micro/nanofiber is fabricated by the use of femtosecond pulse irradiation. Such an FBG can be directly exposed to the surrounding medium without etching or thinning treatment of the fiber and it exhibits high RI sensitivity especially when the higher order of fiber mode is utilized. The FBG in MNF can be used in RI measurement and other optical fiber sensor applications.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions. For example, a person of skill in the art will be aware that the techniques according to the present invention can be combined with the teachings of Florea et al., "Fabrication and Characterization of Photonic Devices Directly Written in Glass Using Femtosecond Laser Pulses," *J. Lightwave Technol.* 21, 246 (2003), and Mihailov et al., "Bragg Gratings Written in All-SiO2 and Ge-Doped Core Fibers With 800-nm. Femtosecond Radiation and a Phase Mask," *J. Lightwave Technol.* 22, 94 (2004).

What is claimed is:

1. An ambient environment refractive index sensing device comprising:
    an optical micro/nanofiber having Fiber Bragg grating comprising periodic refractive index changes at predetermined intervals within a core of the optical micro/nanofiber, the optical micro/nanofiber is a cladding-less fiber,
    wherein the optical micro/nanofiber, for being immersed in an ambient medium, is capable of measuring refractive index of the ambient medium surrounding the optical micro/nanofiber; and
    wherein the optical micro/nanofiber having a diameter of 2 μm blue-shifts center wavelength of the Fiber Bragg grating to exhibit high measurement sensitivity.

2. The refractive index sensing device of claim 1, wherein the measurement of the refractive index of the ambient medium surrounding the optical micro/nanofiber is operated in third or higher order resonance mode to obtain high measurement sensitivity.

3. The refractive index sensing device of claim 1, wherein the refractive index of the ambient medium is in a range of 1.32 to 1.46.

4. An ambient environment refractive index sensing system comprising:
    the refractive index sensing device of claim 1;
    a light source for generating light, which is transmitted to the refractive index sensing device; and
    an optical spectrum analyzer for measuring the center wavelength blue-shifted by the refractive index sensing device;
    wherein the measurement of the refractive index of the ambient medium surrounding the optical micro/nanofiber is operated in a third or higher order resonance mode having more energy distributed outside the optical micro/nanofiber to obtain high measurement sensitivity.

5. The refractive index sensing system of claim 4, wherein the measurement of the refractive index of the ambient medium surrounding the optical micro/nanofiber is operated in a fifth order resonance mode at the reflective index of 1.44.

* * * * *